United States Patent
Greenland (12)

(10) Patent No.: US 6,245,176 B1
(45) Date of Patent: Jun. 12, 2001

(54) METHOD OF PRODUCING ZONE SPECIFIC PEELABLE HEAT SEALS FOR FLEXIBLE PACKAGING APPLICATIONS

(76) Inventor: Steven J. Greenland, 6 Rollins Farm Dr., Stratham, NH (US) 03885

( * ) Notice: Subject to any disclaimer, the term of this patent is extended or adjusted under 35 U.S.C. 154(b) by 0 days.

(21) Appl. No.: 08/950,891

(22) Filed: Oct. 15, 1997

Related U.S. Application Data

(63) Continuation of application No. 08/547,060, filed on Oct. 23, 1995, now abandoned.
(51) Int. Cl.[7] .................................................. B32B 31/00
(52) U.S. Cl. ......................... 156/182; 156/152; 156/234; 156/249; 156/254; 156/344; 206/219; 383/210
(58) Field of Search ...................... 156/182, 249, 156/254, 344, 152, 234; 206/219; 383/210

(56) References Cited

U.S. PATENT DOCUMENTS

| | | | |
|---|---|---|---|
| 2,932,385 | * 4/1960 | Bollmeier et al. | 206/219 |
| 3,256,981 | * 6/1966 | Kurtz | 383/210 |
| 4,252,846 | * 2/1981 | Romesberg et al. | 156/334 |
| 5,287,961 | * 2/1994 | Herran | 206/219 |
| 5,891,500 | * 4/1999 | Brodie | 383/210 |

FOREIGN PATENT DOCUMENTS

1536428 * 12/1978 (GB) .................................... 383/210

* cited by examiner

*Primary Examiner*—John J. Gallagher
(74) *Attorney, Agent, or Firm*—John B. Hardaway, III; Hardaway/Mann IP Group

(57) ABSTRACT

A method for creating peelable or frangible seals comprising the steps of: 1) selecting a first planar film with a polyethylene based resin disposed on its surface; 2) defining a frangible sealing zone on a surface of the first planar film; 3) heat sealing a second planar film to the frangible zone where the second planar film has a seal surface comprising a plurality of polymers; and 4) cooling the first and second planar films and frangible zone. A seal is created whereby peeling away the second planar film causes a rupture in the polymers disposed on the second planar film's surface.

5 Claims, 3 Drawing Sheets

METHOD OF PRODUCING ZONE SPECIFIC PEELABLE HEAT SEALS FOR FLEXIBLE PACKAGING APPLICATIONS

This application is a file wrapper continuation of application Ser. No. 08/547,060 filed Oct. 23, 1995, now abandoned.

1. FIELD OF THE INVENTION

The present invention relates to an improvement for packages constructed of flexible heat sealable plastic films. More specifically, the present invention relates to a method of producing peelable or frangible seals in specific areas of the package construction to facilitate novel package designs. It shall be understood that "peelable" or "frangible" seals as herein described shall be understood to be the property of a heat seal joint formed between two flexible film webs of being able to open in the original plane of joining by the action of a pulling force. The separation will occur without wrenching off or tearing occurring in either of the film materials used to form the joint.

2. BACKGROUND OF THE INVENTION

As flexible barrier packages have continued to evolve and gain consumer acceptance in the world market, manufacturers of heat sealable packaging films have developed many specialty products with consumer convenience and practicality in mind. The easy open package is one such innovation. These types of film products are designed to provide hermetic heat seals with a calculated strength. An ideal product of this kind will produce a heat seal strength low enough to be opened by pulling apart manually without the need for any special tools. Additionally, the seals must be strong enough to maintain the integrity of the package during transportation and storage. Film packages with frangible seals are another application for this same easy open technology.

Existing methods of producing easy open flexible packages include sealing together two different types of films under carefully controlled conditions. The resulting heat seal is a thermoplastic adhesive bond that can be pulled apart. Such an easy open seal may be described as an "adhesive rupture" mechanism. An example of such a seal is the bond that may be formed between film web of low density EVA polyethylene and a high impact styrenes. Sealing a low density polyethylene film to a rubber modified high density polyethylene film is another such example of an adhesive rupture peel seal. Peelable heat seals of this type require the use of two distinct materials and possible package configurations are therefore limited. The obtained peel strength may also be overly sensitive to the conditions used to produce the seal. Peelable seals of this kind may also fail to provide required resistance to chemical attack.

Still another method of producing peelable or frangible seals involves the use of heat activatable adhesive coating. The adhesives are applied to the film substrate as water based liquid emulsions or solvent based solutions, then dried to form a film. Typically, flexographic or gravure process is employed and therefore these systems may also be applied as patterned zone coatings. An example of such a system is the "Adcote" line of coatings manufactured by Morton International of Chicago, Ill. Other systems may be applied as 100% solids using hot melt application equipment. These heat activatable adhesives form peelable or frangible seals when heat sealed to various compatible film materials. All peelable seals of this type lack resistance to chemical attack by solvents and other aggressive chemicals.

Yet another method of producing peelable or frangible heat seals involves the use of "cohesive rupture" films. These films are capable of forming peelable seals when sealed to themselves or to a standard packaging film fabricated from a compatible polymer. The peel mechanism itself is created at the time of extrusion. The film sealant layer is comprised of a homogenized blend of various heat-sealable, non-heat-sealable, and compatible polymers that will not form a solution. The layers of polymer matrix immediately below the point of conversion with another film in the heat seal area has a calculated cohesive strength. As the heat seals are pulled apart, the polymer matrix splits. The strength of the obtained heat seal may be altered by the exact formula percentages utilized in the homogenized blend. A further benefit of such a system is the visible evidence that a hermetic seal has been produced as witnessed by the transfer of material upon opening. One such peelable film is manufactured by UCB, S.A., Bruxelles, Belgium under the trade name "Rayopeel". Rayopeel is comprised of four separate polymer components. The first component is a heat-sealable rigid olefinic polymer. A non-heat sealable polymer, which does not form a solution with the first component polymer is chosen for the second component. The third component is a branched olefinic polymer and the fourth component is a polymer that is compatible with all the polymers chosen to represent the first three components. U.S. Pat. No. 3,879,492 to Bontinick describes the composition of the Rayopeel film in detail, which is incorporated herein by reference. The film reliably produces peelable seals that fall within a narrow and predictable range of force. Additionally, the product has a wide process window that will produce closely repeatable results. The material has also proven to be highly resistant to chemical attack and energy deterioration. The single most limiting aspect of this type of peelable system is the requirement to compromise the entire package strength in order to integrate the peelable or frangible seal function.

3. SUMMARY OF THE INVENTION

The present invention is a new method for achieving peelable or frangible heat seals. The first aspect of the invention is to provide a method for selectively creating peelable or frangible seals in a package otherwise designed for maximum strength. Another objective is providing selectively peelable or frangible heat seals that will function within a narrow range of force but provide a broad heat seal process window. Still another objective is to provide a simplified manufacturing process that will produce peelable or frangible heat seals with a high degree of reliability that can visibly evidence functional security. The present invention also provides a means of producing zone specific peelable or frangible heat seals that can resist the chemical attack afforded by common solvents, corrosives, and other reactive chemicals commonly found as constituents of two part reactive adhesive systems.

4. BRIEF DESCRIPTION OF THE DRAWINGS

5. DETAILED DESCRIPTION OF THE ILLUSTRATED EMBODIMENTS

Figure 1:
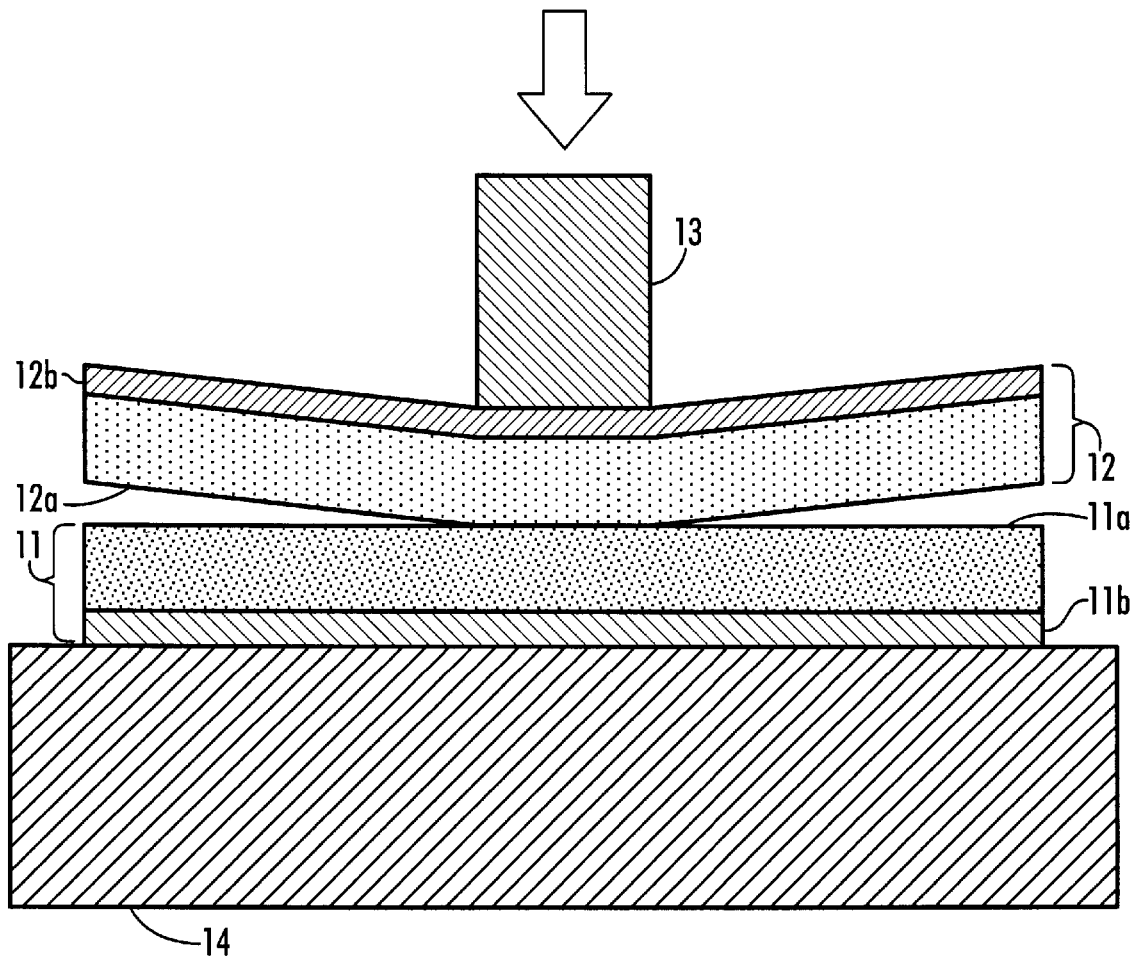
FIG. 1 is a sectional view of the first phase of the coating process in accordance with the present invention.

Referring initially to FIG. 1, a cross sectional view of the first step of the coating method in accordance with the present invention is shown. The polyethylene/polyester laminate film to be coated is shown at 11, with inner polyethylene sealant 11a and oriented polyester substrate 11b. The coating material used for coating is shown at 12, with inner UCB Rayopeel sealant layer 12a and outer supporting oriented polyester layer 12b superimposed over laminate film to be coated so as Rayopeel sealant blend 12a contacts polyethylene sealant 11a. Layer 12a can contain from 5 to 20 percent polybutylene by weight. The base of film 11 is supported from below by a rigid base and covered by ¼ inch thick silicone rubber of 60 durometer hardness. A heated aluminum sealing die indicated at 13 is applied to the polyester surface 12a with a pressure of about 25 pounds per square inch and a temperature of about 320 degrees Fahrenheit for a period of 0.25 to 1.0 seconds. The heat sealable polyethylene 11a and heat sealable UCB Rayopeel film 12a are caused to flow and join into a melt bonded relationship. The sealing die 13 is then removed from the polyester 12b, and the heat sealable materials allowed to cool and freeze.

Figure 2:
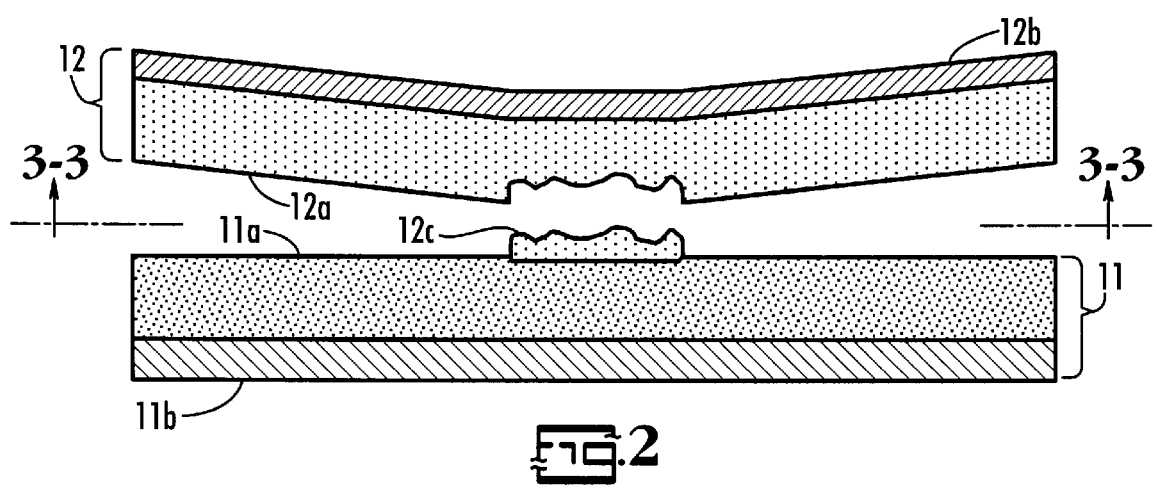
FIG. 2 is a sectional view of the second phase of the coating process in accordance with the present invention.
Figure 3:
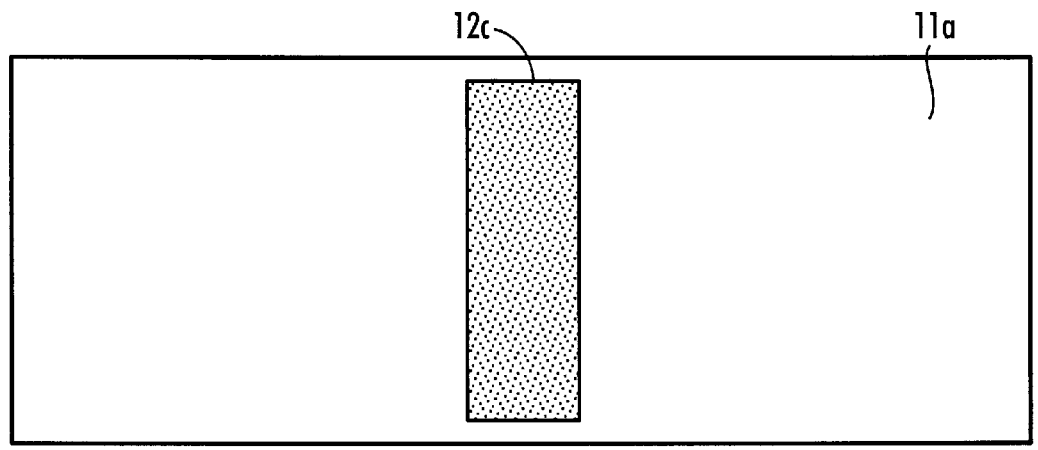
FIG. 3 is a sectional view of FIG. 2 taken along line 3—3 of FIG. 2.

In FIG. 2 the UCB Rayopeel film is pulled away from the polyester/polyethylene film lamination 11. A portion of the Rayopeel film blend for the surface 12a is caused to cleave and split from the matrix resulting in a zone of Rayopeel film blend corresponding to the size of the heat seal die 13. A cross section of FIG. 2 taken at line 3—3 is shown in FIG. 3. The resulting peel seal or frangible seal zone shown by 12c. and the corresponding transferred portion 12, illustrated in FIG. 2 and 3. Said zone shows visible evidence of having been coated as witnessed by a translucent white appearance in the zone.

Figure 4:
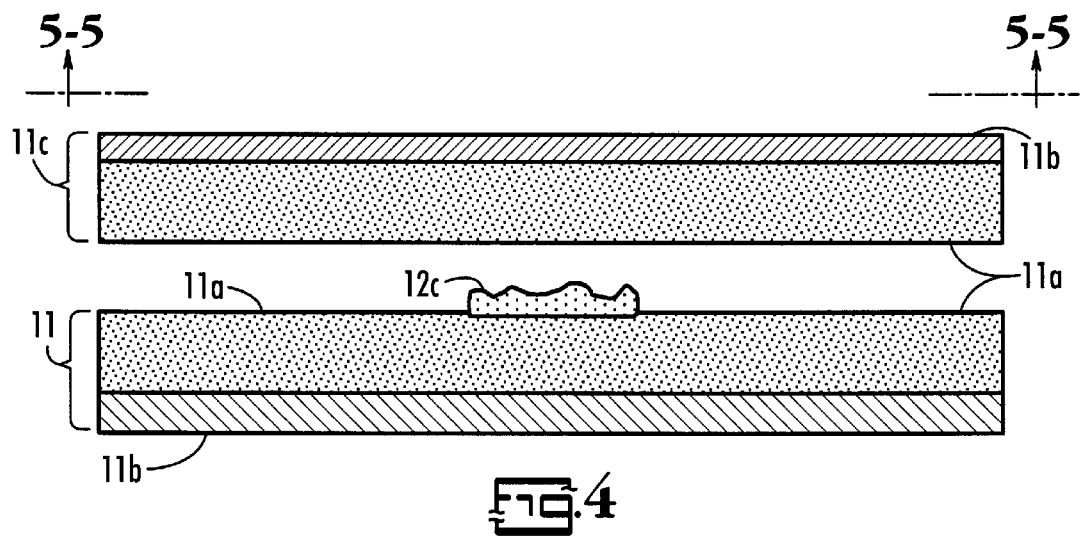
FIGS. 4 through 5 are diagrammatic representations of a two part mixing pouch constructed using the coating method of the present invention.
Figure 5:
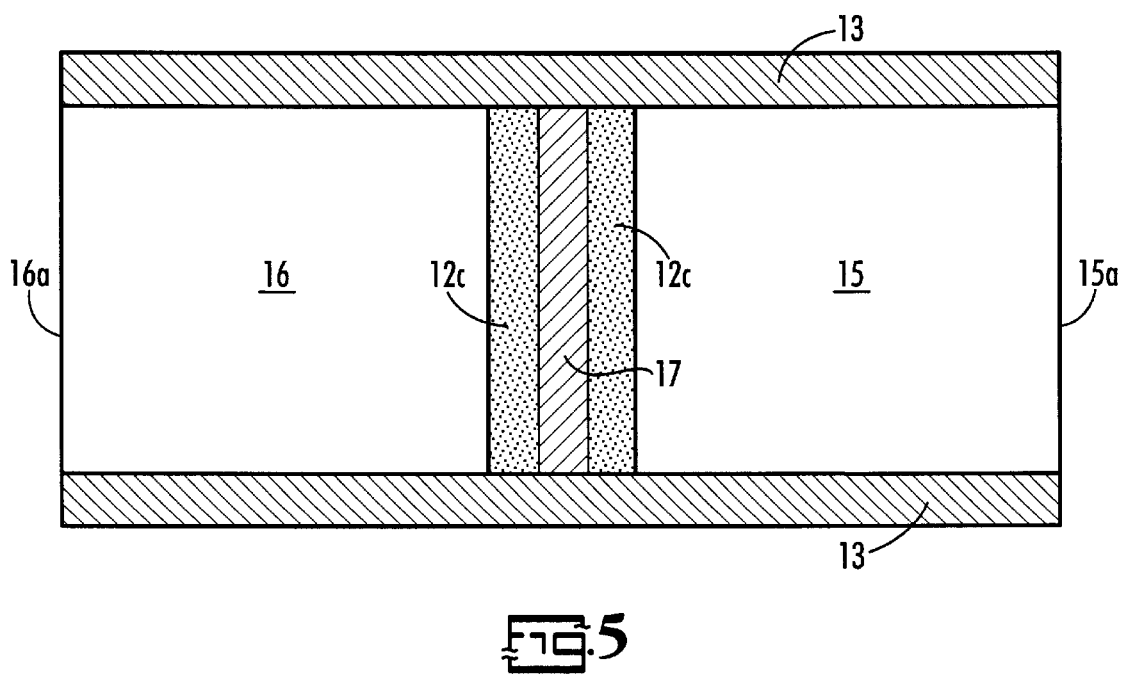

Referring to FIG. 4 and 5 a method of producing a two part fluid mixing package in accordance with the present invention is shown. FIG. 4 is a cross sectional view wherein the now zone coated film shown in FIG. 3 has been overlaid with a second layer of polyethylene film 11c. The two film webs are oriented so as the two polyethylene sealable layers 11a are confronting. FIG. 5 is a cross section of FIG. 4 taken at line 5—5 and to which has been added side heat seals 13, and a center frangible seal 17. Two distinct compartments 15 and 16 are defined by the upper and lower film walls of 11 and 11c, and the side seals 13, and separated by the frangible seal 17 formed from transferred portion 12c. This illustrates that the Rayopeel seal may be resealed after rupture. It should be noted that the side seals 13 and frangible seal 17 are made using the same process conditions of approximately 25 pounds per square inch at 375 degrees Fahrenheit for 0.5 seconds. The coated zone 12c intersects the side seals 13 but does not extend through them. The side seals at 13 have a heat seal with a tensile strength measurable from 5 to 14 pounds per linear inch. The center frangible heat seal 17, was found to have a measurable heat seal strength between 1.0 and 1.75 pounds per linear inch. The pouch openings shown at 15a and 16a are later used to fill the respective components in chambers 15 and 16 then subsequently hermetically heat sealed shut.

I claim:

1. A method of thermoplastic zone coating to produce frangible seals comprising the steps of:

selecting a first planar film, said first planar film having a polyethylene based resin disposed on a surface for producing a strong hermetic seal and defining a frangible sealing zone thereon;

heat sealing with a heat seal die a second planar film to said frangible sealing zone to form a heat sealed zone substantially corresponding in size to that of said heat seal die, said second planar film having a heat seal layer disposed on a surface thereof, said head seal layer comprising a mixture of heat sealable and non-heat sealable polymers;

cooling said frangible sealing zone and said first and second planar films whereby said first and second planar films join in a melt bonded relationship;

cohesively rupturing said heat seal layer of said second planar film from said second planar film to rupture only said heat seal layer and to transfer a portion of said heat seal layer from said surface of said second planar film to said surface of said first planar film within said frangible sealing zone, said portion being substantially coextensive with and corresponding in size to said heat sealed zone and possessing the ability to be reheat sealed to a second film.

2. The method of making a thermoplastic zone coating to produce frangible seals as recited in claim 1, wherein the heat seal layer has a cohesive strength less than the cohesive strength between said first planar film and said frangible sealing zone.

3. A method of thermoplastic zone coating to produce frangible seals comprising the steps of:

selecting a first planar film, said first planar film having a polyethylene based resin disposed on a surface for producing a strong hermetic seal and defining a frangible sealing zone thereon;

heat sealing a second planar film to the first planar film within the area defined by said frangible sealing zone with a heat seal die, said second planar film having a heat seal layer disposed on a surface thereof and comprising a mixture of heat sealable and non-heat sealable polymers;

cooling said frangible sealing zone and said first and second planar films whereby said first and second planar films join in a melt bonded relationship;

peeling apart said first and second planar films and causing cohesive rupture of said heat seal layer of said second planar film resulting in the transfer of a continuous portion of heat seal material from said second planar film to the surface of said first planar film.

4. The method of making a thermoplastic zone coating to produce frangible seals as recited in claim 3, wherein the transfer of heat seal material from said second planar film to said first planar film results in the visual evidence of said transfer.

5. The method of making a thermoplastic zone coating to produce frangible seals as recited in claim 3, wherein the cohesive rupture of the heat seal layer of said second planar film results in the splitting of the polymer matrix comprising said homogenized mixture of heat sealable and non-heat sealable polymers.

* * * * *